United States Patent [19]

Culp

[11] Patent Number: 5,178,012

[45] Date of Patent: Jan. 12, 1993

[54] TWISTING ACTUATOR ACCELEROMETER

[75] Inventor: Gordon W. Culp, Van Nuys, Calif.

[73] Assignee: Rockwell International Corporation, Seal Beach, Calif.

[21] Appl. No.: 803,804

[22] Filed: Jan. 13, 1992

Related U.S. Application Data

[62] Division of Ser. No. 708,643, May 31, 1991.

[51] Int. Cl.$^5$ .......................................... G01P 15/13
[52] U.S. Cl. .................................. 73/510; 73/517 A; 73/517 B
[58] Field of Search ............ 73/517 B, 517 R, 517 A, 73/510; 310/329

[56] References Cited

U.S. PATENT DOCUMENTS

| | | | |
|---|---|---|---|
| 4,638,669 | 1/1987 | Chou | 73/517 R |
| 4,803,883 | 2/1989 | Shutt | 73/517 B |
| 5,009,111 | 4/1991 | West et al. | 73/517 B |
| 5,048,319 | 9/1991 | Neuhaus | 73/517 B |

Primary Examiner—John E. Chapman
Attorney, Agent, or Firm—H. Fredrick Hamann; Harry B. Field; Steven E. Kahm

[57] ABSTRACT

This invention is for an accelerometer having a stack comprising both linearly responsive transducers and rotationally responsive transducers for measuring accelerations in the six degrees of freedom. Linear transducers such as lifters and tangenters can be combined in a stack with rotational transducers such as teeters and twisters which react to accelerations. Position sensors can be placed adjacent the transducers to sense their movement. When the position sensors detect a change, a current is applied to the transducer to return the transducer to its rest state. The current applied to return the transducer to its rest state is proportional to the acceleration experienced by the transducer, thereby providing a means to measure the acceleration on the transducer.

3 Claims, 3 Drawing Sheets

Tangenter (prior art)

Lifter (prior art)

Cylier

Cylmorph

Spherier

Sphermorph

Twister

Twismorph

Torsier

Tormorph

Teeter

Teemorph

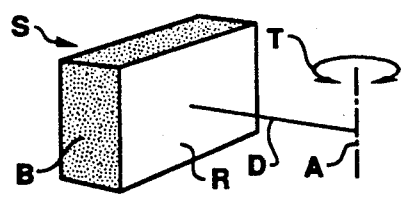
Swinger Fig.13
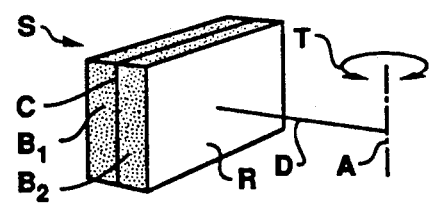
Swingmorph Fig.14
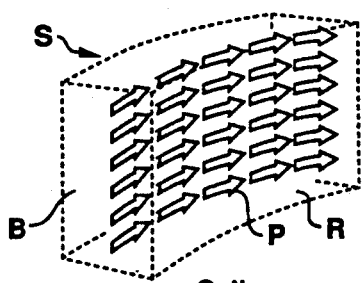
Cyller Fig.15
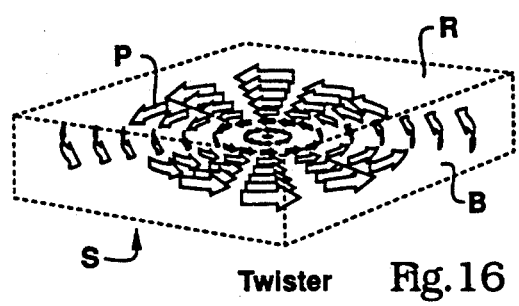
Twister Fig.16
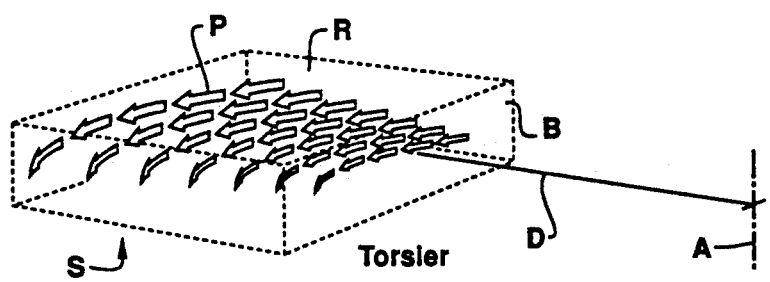
Torsier Fig.17
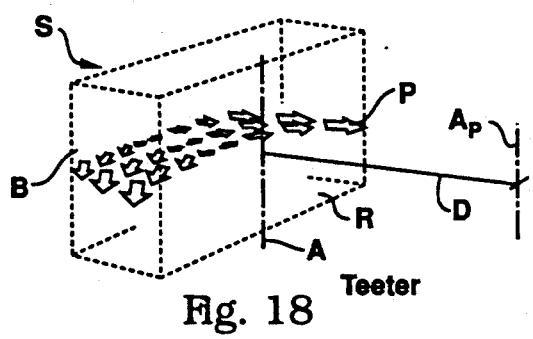
Teeter Fig.18
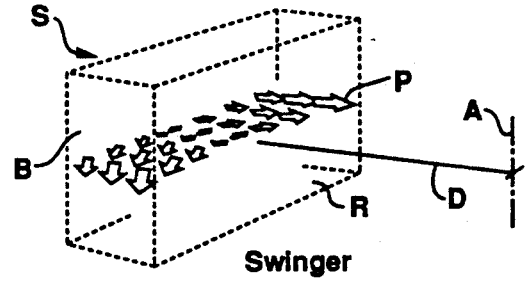
Swinger Fig.19
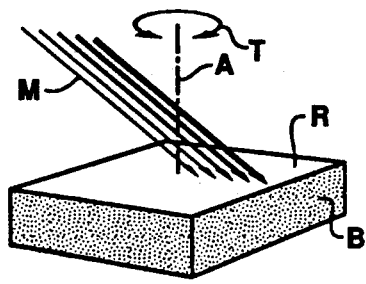
Fig.20
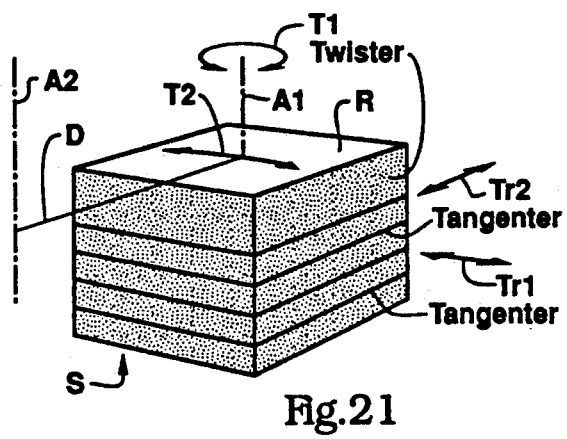
Fig.21

TWISTING ACTUATOR ACCELEROMETER

This is a divisional of copending application Ser. No. 07/708,643 filed on May 31, 1991.

BACKGROUND OF THE INVENTION

1. Field of the Invention

The present invention generally relates to accelerometers and more specifically to accelerometers with piezoelectric actuators.

2. Background Art

In the past piezoelectric actuator elements have been used in accelerometers. When the piezoelectric element is acted on by an acceleration, the force applied to the piezoelectric element strains the element and yields an electric current proportional to the force applied to the piezoelectric element. In some embodiments piezoelectric elements have been employed in conjunction with non-contact electron transfer effects to measure the distance between the piezoelectric element and an object. When such an instrument is accelerated the distance between the object and the piezoelectric element changes and is measured. The distance change is directly related to the acceleration. The displacements measured have until now been limited to linear accelerations of the piezoelectric elements. Angular accelerations were not possible to measure directly with piezoelectric elements since they were linearly polarized.

SUMMARY OF THE INVENTION

The present invention is for a piezoelectric accelerometer having twisting piezoelectric elements which have curvilinear polarization to directly measure angular accelerations. By combining twisting actuators and linear actuators all six degrees of freedom of movement can be measured.

BRIEF DESCRIPTION OF THE DRAWINGS

FIG. 13 is a perspective view of a swinger.
FIG. 14 is a perspective view of a swingmorph.
FIG. 15 is a perspective view of the responsivity in a cylier.
FIG. 16 is a perspective view of the responsivity in a twister.
FIG. 17 is a perspective view of the responsivity in a torsier.
FIG. 18 is a perspective view of the responsivity in a teeter.
FIG. 19 is a perspective view of the responsivity in a swinger.
FIG. 20 is a schematically illustrates a typical rotary transducer segment during manufacture receiving incident energy to set the responsivity of the material.
FIG. 21 is a perspective view of a stack of transducer segments having two tangenters and a twister.

DETAILED DESCRIPTION

Figure 1:
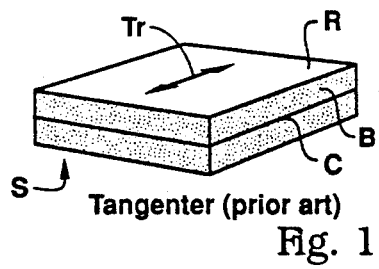
FIG. 1 is a perspective view of a tangenter dimorph.

FIG. 1 is a perspective view of a prior art tangenter, a transducer that acts in a tangential direction in response to an electric signal. The transducer comprises a body B having an output surface R opposite a stationary surface S, the latter generally considered as remaining stationary for reference. Applying an electrical signal to the input C of the transducer causes surface R to translate in directions Tr parallel to and relative to stationary surface S. Transducer body B is made of electrodeformable material. When the electrodeformable material is of the shearing type, translation Tr is not generally accompanied by other deformations or changes of shape. A body composed of a different electrodeformable material may affect translation Tr in combination with one or more other deformations or changes of shape. Shearing electrodeformable material is preferred for tangenters because no portion of the tangential stroke or force is needed for other deformations. The illustrated tangenter has a dimorph electrical configuration, the dimorph having active electrical portions interior to body B, and having external electrical portions maintained at electrical ground. Grounded external surfaces allow assembly of dimorph tangenters with other objects without regard for the electrical state thereof.

Letter designations of transducer portions and actions are generally carried through in a consistent manner for subsequent detailed description. Each transducer is represented by two forms, a single body component form that may have an electrical connection on an external surface, and a form generally suffixed -morph having external surfaces that do not participate electrically in the activation of the transducer. The -morph transducer configurations are generally made by assembling two single bodied transducer elements so that the activated electrical connection lies interior to the assembled body.

The term "dimorph configuration" extends the use of the term "dimorph," originally coined in applicant's prior patent, U.S. Pat. No. 4,928,030, incorporated here by reference, to describe a linear shearing transducer element having at least two opposite broad surfaces that remain electrically neutral and mechanically bondable without regard to the electrical state of the material to which bonded, is herein extended to include a diverse set of twisting and turning transducers that are likewise bondable. Dimorph transducers are herein treated as fundamental transducer building blocks that are bondable to each other, to other members of the set, and to support means in any order while preserving the electrically independent addressability of each dimorph.

Figure 2:
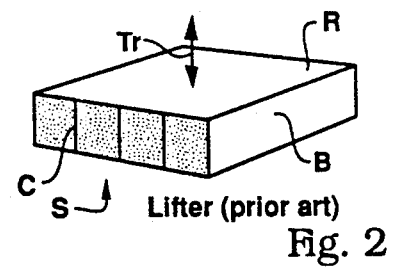
FIG. 2 is a perspective view of a lifter stack.

FIG. 2 is a perspective view of a prior art lifter, a transducer that acts in a direction perpendicular to a broad surface in response to an electric signal. The transducer comprises a body B having an output surface R opposite a stationary surface S, the latter generally considered as remaining stationary for reference. Applying an electrical signal to the input C of the transducer causes surface R to translate in directions Tr perpendicular to and relative to stationary surface S. Transducer body B is made of electrodeformable material. When the electrodeformable material is of the shearing type, Translation Tr is not generally accompanied by other deformations or changes of shape. Body B composed of a different electrodeformable material may affect translation Tr in combination with one or more other deformations or changes of shape. Shearing electrodeformable material is preferred for lifters because no portion of the lifting stroke or force is needed for other deformations. The illustrated lifter has a dimorph electrical configuration, the dimorph having active electrical portions interior to body B, and having external electrical portions, if any, maintained at electrical ground. Grounded external surfaces allow assembly of dimorph lifters with other objects without regard for the electrical state thereof.

Although the term "shear" is commonly defined as linear translation of a first plane parallel to itself and relative to a second (assumed stationary) plane that is parallel to the first plane, both planes transecting a portion of a solid substance, the term is herein defined to further include curved planes and curved translation, the curvature being a slowly changing variable. The sense of slowly changing curvature is herein defined as that curvature that, considered from the perspective of microscopic examination of the causes of shear, behaves like, and is generable by the same mechanisms as, the aforementioned commonly defined linear translation of shear. In other words, an infinitesimal element of a curved-shearing solid substance would appear to be undergoing essentially the same degree of shear as an adjacent infinitesimal element, when the curvature is a slowly changing parameter.

Figure 3:
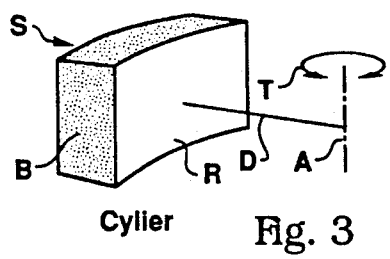
FIG. 3 is a perspective view of a cylier.

FIG. 3 is a perspective view of a cylier, a transducer that acts in a cylindrical or annular direction relative to a broad surface in response to an electric signal. The transducer comprises a lamina of a cylinder segment body B having an output surface R opposite a stationary surface S, the latter generally considered as remaining stationary for reference. Applying an electrical signal to an input (not shown) of the transducer causes surface R to turn in directions T relative to stationary surface S about axis A that is located distance D from surface R. Body B is made of electrodeformable material. When the electrodeformable material is of the shearing type, turning stroke T is not generally accompanied by other deformations or changes of shape. Body B composed of a different electrodeformable material may affect turning stroke T in combination with one or more other deformations or changes of shape. Shearing electrodeformable material is preferred for cyliers because no portion of the cylindrical stroke or force is needed for other deformations. The illustrated cylier does not have a dimorph electrical configuration, requiring additional electrical insulation when assembling such cyliers to other components.

Figure 4:
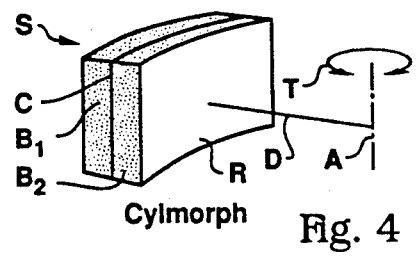
FIG. 4 is a perspective view of a cylmorph.

FIG. 4 is a perspective view of a cylmorph, a transducer that acts in a cylindrical or annular direction relative to a broad surface in response to an electric signal. The transducer comprises a lamina of a cylinder segment body B1, B2 having an output surface R opposite a stationary surface S, the latter generally considered as remaining stationary for reference. Applying an electrical signal to input C of the transducer causes surface R to turn in directions T relative to stationary surface S about axis A that is located distance D from surface R. Body B1, B2 is made of electrodeformable material. When the electrodeformable material is of the shearing type, turning stroke T is not generally accompanied by other deformations or changes of shape. Body B1, B2 composed of a different electrodeformable material may affect turning stroke T in combination with one or more other deformations or changes of shape. Shearing electrodeformable material is preferred for cylmorphs because no portion of the turning stroke or force is needed for other deformations. The illustrated cylmorph has a dimorph electrical configuration, the dimorph having active electrical portions interior to body B, and having external electrical portions maintained at electrical ground. Grounded external surfaces allow assembly of cylmorphs to other objects without regard to the electrical state thereof. By way of example, cylmorph transducers made of piezoelectric shear material may have a central electrode C separating body portions B1 and B2, these portions contributing respective cylindrical stroke portions to the whole stroke of the transducer.

Figure 5:
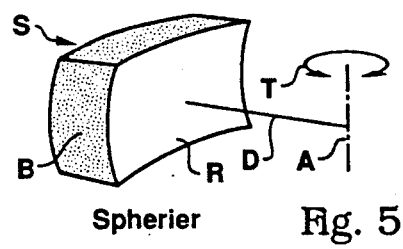
FIG. 5 is a perspective view of a spherier.

FIG. 5 is a perspective view of a spherier, a spherical segment transducer that turns a broad spherical segment surface in response to an electric signal. The transducer comprises a lamina of a spherical segment body B having an output surface R opposite a stationary surface S, the latter generally considered as remaining stationary for reference. Applying an electrical signal to an input (not shown) of the transducer causes surface R to turn in directions T relative to stationary surface S about axis A that passes through or near the center of spherical curvature. Body B is made of electrodeformable material. When the electrodeformable material is of the shearing type, turning stroke T is not generally accompanied by other deformations or changes of shape. Body B composed of a different electrodeformable material may affect turning stroke T in combination with one or more other deformations or changes of shape. Shearing electrodeformable material is preferred for spheriers because no portion of the turning stroke or force is needed for other deformations. The illustrated spherier does not have a dimorph electrical configuration and may require additional electrical insulation when assembling to other components. Electromechanical behavior of the spherier is similar to that of the cylier (FIG. 3).

Figure 6:
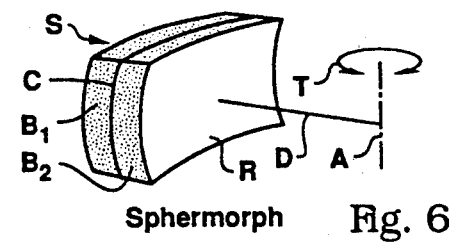
FIG. 6 is a perspective view of a sphermorph.

FIG. 6 is a perspective view of a sphermorph, a transducer that turns a broad spherical segment surface in response to an electric signal. The transducer comprises laminae of a spherical body of segments B1 and B2 having an output surface R opposite a stationary surface S, the latter generally considered as remaining stationary for reference. Applying an electrical signal to input C of the transducer causes surface R to turn in directions T relative to stationary surface S about axis A that passes through or near the center of spherical curvature. Body B1, B2 is made of electrodeformable material. When the electrodeformable material is of the shearing type, turning stroke T is not generally accompanied by other deformations or changes of shape. Body B1, B2 composed of a different electrodeformable material may affect turning stroke T in combination with one or more other deformations or changes of shape. Shearing electrodeformable material is preferred for sphermorphs because no portion of the turning stroke or force is needed for other deformations. The illustrated sphermorph has a dimorph electrical configuration, having external electrical portions maintained at electrical ground. Grounded external surfaces allow assembly of sphermorphs with other objects without regard to the electrical state thereof. Sphermorph transducers may have a central electrode C that divides the body into two portions B1 and B2, these portions contributing respective turning stroke portions to the whole stroke of the transducer.

Figure 7:
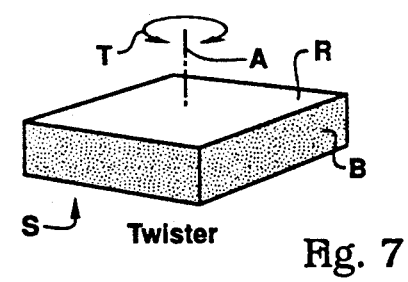
FIG. 7 is a perspective view of a twister.

FIG. 7 is a perspective view of a twister, a transducer that twists a broad surface in response to an electric signal. The transducer comprises body B having an output surface R opposite a stationary surface S, the latter generally considered as remaining stationary for reference. Applying an electrical signal to an input (not shown) of the transducer causes surface R to twist in directions T relative to stationary surface S about axis A that passes through some point of surface R, for example, the centroid of surface R. Body B is made of laminae electrodeformable material. When the electrodeformable material is of the shearing type, twisting stroke T is not generally accompanied by other deformations or changes of shape. It is emphasized that surface R does not change shape during twisting. Body B composed of a different electrodeformable material may affect twisting stroke T in combination with one or more other deformations or changes of shape. Shearing electrodeformable material is preferred for twisters because no portion of the twisting stroke or force is needed for other deformations. The illustrated twister does not have a dimorph electrical configuration and may require additional electrical insulation when assembling to other components.

Figure 8:
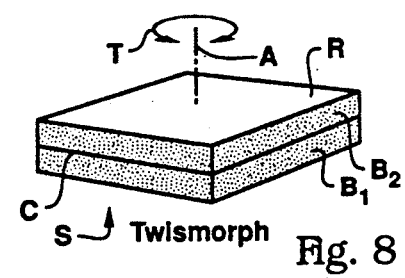
FIG. 8 is a perspective view of a twismorph.

FIG. 8 is a perspective view of a twismorph, a transducer that twists a broad surface in response to an electric signal. The transducer comprises laminae of body B1, B2 having an output surface R opposite a stationary surface S, the latter generally considered as remaining stationary for reference. Applying an electrical signal to input C of the transducer causes surface R to twist in directions T relative to stationary surface S about axis A that passes through some point of surface R, for example, the centroid of surface R. Body B1, B2 is made of electrodeformable material. When the electrodeformable material is of the shearing type, twisting stroke T is not generally accompanied by other deformations or changes of shape. As with the twister of FIG. 7, the shape of surface R remains unchanged during twisting. Body B1, B2 composed of a different electrodeformable material may affect twisting stroke T in combination with one or more other deformations or changes of shape. Shearing electrodeformable material is preferred for twisters because no portion of the twisting stroke or force is needed for other deformations. The illustrated twisting transducer has a dimorph electrical configuration, having external electrical portions maintained at electrical ground. Grounded external surfaces allow assembly of twismorphs with other objects without regard to the electrical state thereof. Twismorph transducers may have a central electrode C that divides the body into two portions B1 and B2, these portions contributing respective twisting stroke portions to the whole stroke of the transducer.

Figure 9:
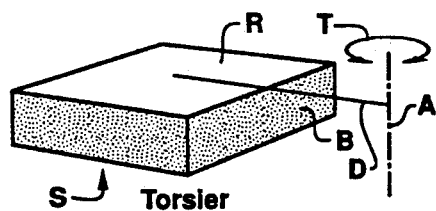
FIG. 9 is a perspective view of a torsier.

FIG. 9 is a perspective view of a torsier, a transducer that applies torsion to a broad surface in response to an electric signal. The transducer comprises body B having an output surface R opposite a stationary surface S, the latter generally considered as remaining stationary for reference. Applying an electrical signal to an input (not shown) of the transducer causes surface R to execute torsion relative to stationary surface S in directions T about axis A at distance D from some point of surface R, for example, the centroid of surface R. Body B is made of a lamina of electrodeformable material. When the electrodeformable material is of the shearing type, torsion T is not generally accompanied by other deformations or changes of shape, and the shape of surface R remains unchanged during torsion. Body B composed of a different electrodeformable material may affect torsion T in combination with one or more other deformations or changes of shape. Shearing electrodeformable material is preferred for torsiers because no portion of the torsion stroke or force is needed for other deformations. The illustrated torsier does not have a dimorph electrical configuration and may require additional electrical insulation when assembling to other components.

Figure 10:
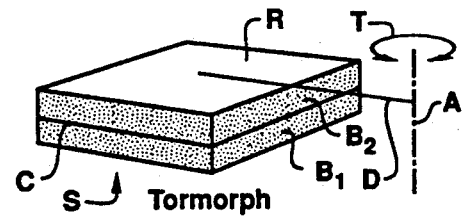
FIG. 10 is a perspective view of a tormorph.

FIG. 10 is a perspective view of a tormorph, a transducer that applies torsion to a broad surface in response to an electric signal. The transducer comprises a body of two laminae B1 and B2 having an output surface R opposite a stationary surface S, the latter generally considered as remaining stationary for reference. Applying an electrical signal to input C of the transducer causes surface R to execute torsion relative to stationary surface S in directions T about axis A at distance D from some point of surface R, for example, from the centroid of surface R. Body portions B1 and B2 are made of electrodeformable material. When the electrodeformable material is of the shearing type, torsion T is not generally accompanied by other deformations or changes of shape, and the shape of surface R remains unchanged during torsion. Bodies composed of a different electrodeformable material may affect torsion T in combination with one or more other deformations or changes of shape. Shearing electrodeformable material is preferred for tormorphs because no portion of the torsion stroke or force is needed for other deformations. The illustrated tormorph has a dimorph electrical configuration wherein electrical input is confined to the interior of the body and external surface portions of the body remain at electrical ground, thereby allowing assembly to other components without regard to the electrical state thereof. The torsional stroke of the tormorph is composed of the sum of the stroke contributions of body portions B1 and B2.

Figure 11:
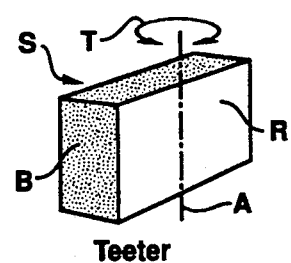
FIG. 11 is a perspective view of a teeter.

FIG. 11 is a perspective view of a teeter, a transducer that applies a teetering motion to a broad surface in response to an electric signal. The transducer comprises body B having an output surface R opposite a stationary surface S, the latter generally considered as remaining stationary for reference. Applying an electrical signal to an input (not shown) of the teeter causes surface R to execute a teetering motion relative to stationary surface S in directions T about axis A that lies in surface R, for example, axis A may be the axis of gyration of surface R. Body B is made of a lamina of electrodeformable material. When the electrodeformable material is of the shearing type, teetering T is not generally accompanied by other deformations or changes of shape, and surface R retains its shape during teetering. Body B composed of a different electrodeformable material may affect teetering T in combination with one or more other deformations or changes of shape. Shearing electrodeformable material is preferred for teeters because no portion of the teetering stroke or force is needed for other deformations. The illustrated teeter does not have a dimorph electrical configuration and may require additional electrical insulation when assembling to other components.

Figure 12:
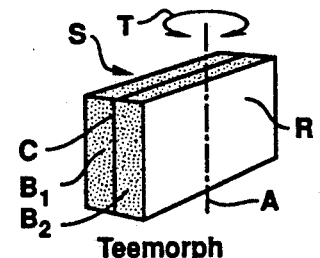
FIG. 12 is a perspective view of a teemorph.

FIG. 12 is a perspective view of a teemorph, a transducer that applies a teetering motion to a broad surface in response to an electric signal. The transducer comprises a body of laminae B1 and B2 having an output surface R opposite a stationary surface S, the latter generally considered as remaining stationary for reference. Applying an electrical signal to input C of the teemorph causes surface R to execute teetering relative to stationary surface S in directions T about axis A lying in surface R, for example, axis A may be the axis of gyration of surface R. Body portions B1 and B2 are made of electrodeformable material. When the electrodeformable material is of the shearing type, teetering motion T is not generally accompanied by other deformations or changes of shape, and surface R teeters without changing shape. Bodies composed of a different electrodeformable material may affect teetering T in combination with one or more other deformations or changes of shape. Shearing electrodeformable material is preferred for teemorphs because no portion of the teetering stroke or force is needed for other deformations. The illustrated teemorph has a dimorph configuration wherein electrical input is confined to the interior of the body while external surface portions of the body remain at electrical ground, thereby allowing assembly of the teemorph to other components without regard to the electrical state thereof. The teetering stroke of the teemorph is composed of the sum of the contributions of body portions B1 and B2.

FIG. 13 is a perspective view of a swinger, a transducer that applies a swinging motion to a broad surface in response to an electric signal. The transducer comprises body B having an output surface R opposite a stationary surface S, the latter generally considered as remaining stationary for reference. Applying an electrical signal to an input (not shown) of the swinger causes surface R to execute a swinging motion in directions T about axis A that lies at distance D from surface R. Thus surface R acts as if it were the seat of a child's swing. The surface remains flat and translates as if held by chains of length D, rotating about axis A. The surface can move either to the left or the right as indicated by the double arrowed direction indicator T in FIG. 13. Body B is made of a lamina of electrodeformable material. When the electrodeformable material is of the shearing type, swinging T is not generally accompanied by other deformations or changes of shape, and the shape of surface R does not change during swinging. Body B composed of a different electrodeformable material may affect swinging T in combination with one or more other deformations. Shearing electrodeformable material is preferred for swingers because no portion of the swinging stroke or force is needed for other deformations. The illustrated swinger does not have a dimorph electrical configuration and may require additional electrical insulation when assembled to other components.

FIG. 14 is a perspective view of a swingmorph, a transducer that applies a swinging motion to a broad surface in response to an electric signal. The transducer comprises a body of laminae B1 and B2 having an output surface R opposite a stationary surface S, the latter generally considered as remaining stationary for reference. Applying an electrical signal to input C of the swingmorph causes surface R to execute swinging relative to stationary surface S in directions T about axis A that lies parallel to and at distance D from surface R. Body portions B1 and B2 are made of electrodeformable material. When the electrodeformable material is of the shearing type, swinging motion T is not generally accompanied by other deformations. Bodies composed of a different electrodeformable material may affect swinging T in combination with one or more other deformations. Shearing electrodeformable material is preferred for swingmorphs because no portion of the swinging stroke or force is needed for other deformations. The illustrated swingmorph has a dimorph configuration wherein electrical input is confined to the interior of the body while external surface portions of the body remain at electrical ground, thereby allowing assembly of the swingmorph to other components without regard to the electrical state thereof. The swinging stroke T of the swingmorph is composed of the sum of the contributions of portions B1 and B2.

Responsivity and responsivity vectors are herein defined as the vector property of a solid transducer-forming substance that develops a vector action in response to an applied vector electric signal. The action includes any combination of deformation due to shear, due to a change in thickness, and due to a change in length. Throughout the Detailed Description it is further specified that all vectors associated with transducer responsivity are slowly varying parameters as previously defined, and any combination of these vectors may include curvilinearity.

FIG. 15 is a perspective view of an embodiment of the cylier transducer of FIG. 3, including body B having (reference) stationary surface S opposite responsive output surface R, with body B phantomed to show responsivity vectors P. Body B has the shape of a segment of a cylinder interior to the wall of which transducer responsivity vectors P are arranged to provide the action described for FIG. 3. When the body material is of the shear type, all vectors have equal magnitudes, when the wall is thin or radially graded magnitudes when the wall is thick, and each vector has a direction at each respective body locus that is generally tangential to the cylinder. The applied electrical signal interacts with the responsivity vectors to cause the described action. When cylier materials produce deformations of shearing in combination with other deformations, the directions of the responsivity vectors are arranged to produce a maximum portion of the action described for FIG. 3 while allowing a minimum of other deformations, thereby relegating the preponderance of action to that desired of the transducer. The preferred body material is piezoelectric.

An alternate embodiment of the cylier or cylmorph transducers using shear responsivity in combination with other deformations may employ progressively changing directions and magnitudes of the responsivity vectors in proportion to the distance from a line or plane.

The responsivity vectors for the spherier are the same as those for the cylier. The only difference is the cylier is a portion of a cylier and the spherier is a portion of a sphere. There is no gradient of responsivity vectors in either the cylier or the spherier.

FIG. 16 is a perspective view of the twister transducer of FIG. 7 having a body B with reference stationary surface S opposite responsive output surface R. Body B is phantomed to show an annular array of responsivity vectors P. Each vector P has at each respective point of the body a direction and magnitude that, in cooperation with an applied electric signal, causes surface R to twist as described for FIG. 7. When body B is made of shear material, and responsivity increases with distance from the axis of twist, and surface R twists without other deformation about the twist axis relative to surface S.

FIG. 17 is a perspective view of the torsier transducer of FIG. 9 having a body B with reference stationary surface S opposite responsive output surface R. Body B is phantomed to show an annular array of responsivity vectors P. Each vector has at each point of the body a direction and magnitude that, in cooperation with an applied electric signal, causes surface R to twist about axis A located distance D from body B. When body B is made of shear material, and responsivity increases with distance from a lesser value at the least distance D to a greater value at the extreme distance from axis A, causing surface R, without changing shape, to rotate about axis A. Magnitudes of responsivity vectors lying on a circle drawn about axis A are equal when shear is the sole transducer action. When deformations other than shear participate, the arrangement of responsivity vectors is altered to minimize non-shear deformations and stressful contentions that detract from the desired transducer action.

FIG. 18 is a perspective view of the teeter transducer of FIG. 11 having a body B with reference stationary surface S opposite responsive output surface R. Body B is phantomed to show one representative plane of an annular array of responsivity vectors P arranged cylindrically about axis Ap. Each vector has at each respective point of the body a direction and magnitude that, in cooperation with an applied electric signal, causes surface R to teeter about axis A located in the plane of surface R. The distance D between axis A and axis Ap depends on the direction and magnitude of deformation of the particular transducer body material. Thus surface R acts as if it were the board of a childs teeter totter. The surface remains flat and translates as if balanced on axis A, rotating about axis A. The surface can move either to the left or the right as indicated by the double arrowed direction indicator T in FIG. 11. When body B is made of shear material, the responsivity increases with distance from a lesser, and alternatively, a zero, value at the dividing plane containing axes A and Ap, to a greater value at the extreme distances at each side of the dividing plane, while at the same time responsivity decreases monotonically with the distance from axis Ap. This causes surface R to teeter about axis A without other deformation.

FIG. 19 is a perspective view of the swinger transducer of FIG. 13 that is similar to the teeter, but has responsivity vectors arranged with a greater radius of curvature so that surface R swings about axis A.

A twisting transducer layer may be assembled as a mosaic of fitted pieces, each piece having a predetermined uniform magnitude and uniform direction of responsivity, the fit of the mosaic pieces being prescribed to provide the desired responsivity of the whole mosaic. Mosaic twisting layers are thus made using established art and methods. However, the mosaic method, while simplifying the distribution of responsivity in electrodeformable material, greatly complicates the assembly of layers, and resulting layers have reduced but not eliminated internal stresses at mosaic piece boundries during activation.

The preferred methods of making twisting transducers combine predetermined configurations of responsivity vectors, predetermined configurations of applied electrical signal vectors, and means of adjusting responsivity vectors that were not initially arranged in a desired manner.

FIG. 20 is a perspective drawing of a typical twisting transducer segment at an intermediate stage of manufacture wherewith body B is given a predetermined distribution of responsivity by a combination of incident energy and material M, the process ending when surface R has the prescribed response to an applied electric signal. The energy and material M has a distribution that is determined by the particular type of twisting transducer. During manufacture of axially symmetric transducers, body B is rotated about an axis, for example, axis A. An off-axis transducer requires rotation of body B about an axis that is perpendicular to and intersects surface R, is perpendicular to and is outside surface R, is parallel to and is contained by surface R, and is parallel to and is outside surface R, or combinations thereof in accordance with the requirements of the particular transducer. In general, the axis of body rotation will be located at a distance from the axis about which transducer action proceeds. Each embodiment of twisting transducer will require a particular combination of energy-material activation rate, intensity, direction, and body rotation during the manufacturing process.

By way of example, a twisting transducer is made by epitaxially depositing shear material with a controlled rate of deposition and an angle of incidence of deposition as the body is rotated that results in the desired twisting transduction.

Controlled epitaxial deposition of twisting transducer bodies includes rotation of the deposition source about a predetermined axis while the transducer remains stationary.

Another method of effecting the rotationally active transducer is the deposition or compaction of transducer material with a first responsivity distribution, and subsequently altering the first distribution to a desired second distribution by altering the vectors with an externally applied curvilinear influence. By way of example, the twister of FIG. 16 is first made with an annular arrangement of equal-magnitude responsivity vectors, after which an external means of responsivity vector magnitude reduction is applied to reduce responsivity with distance as the rotational axis is approached, finally ending on the axis with zero responsivity magnitude. External means include a radial thermal gradient due to a heated area on the axis of minimum responsivity, a radially scanned radiation source with progressively varied intensity, a slow spirally scanned radiation source with progressively varied intensity, progressive demagnetization, and progressive depolarization by a scanned source of electric charge. The external vector adjustment means may be stationary while the transducer is rotated, and alternatively, the vector adjustment means may be scanned or otherwise rotated while the transducer remains stationary. The responsivity adjustment method may be visualized by considering M of FIG. 20 as the adjustment means.

Twisting transducer motions achieved by aforedescribed methods are due to predetermined arrangements of responsivity vectors, while the applied electrical signal has remained uniform in intensity distribution and not necessarily directly contributing to twisting transducer action.

In another class of methods of making twisting transducers, the electrical signal applied to the transducer body is not uniform but has an intensity that varies in a prescribed manner, such as, as a function of distance from a specified axis. For example, a piezoelectric shear twister transducer is first made with an annular distribution of equal-magnitude responsivity vectors, a distribution that would cause excessive internal strain and excess strain near the axis of arrangement when activated by uniform electrical signal intensity. Subsequent to the arrangement of the constant magnitude responsivity vectors, an electrode is applied that has electrical resistivity that varies monotonically with distance from the prescribed axis, having maximum resistivity at the axis and minimum resistivity at the extremes of the transducer body. A potential applied to the less resistive outer portion of the electrode will elicit greater response from the periphery of the transducer due to higher charge density, than electrode portions nearer the axis, thereby producing the desired amount and distribution of twisting transducer action.

It is emphasized that applied curvilinear electrical signals acting in combination with uniform (but curvilinear) responsivity vectors will achieve equivalent rotary transductions. However, in a subset of the embodiments of the present invention, generation of curvilinear electrical signals, for example, curved electric fields, may be less convenient, or may have insufficient strength to achieve the desired transducer actions alone.

In another subset of embodiments, nonuniform electrical signals, for example, potential gradients, and—equivalently for other transducer materials—nonuniform current densities, are included in the scope of the present invention as contributors to, and alternatively, as sole instigators of relatively contention-free twisting transduction.

A twister transducer is fabricated by a combination of: controlled vector magnitude distribution; by controlled magnitude adjustment; and by application of a controlled spatial or areal intensity distribution of the electrical signal.

A diverse class of twisting transducers of the present invention includes composites of the previously described transducers. However, the -morph forms of the aforedescribed transducers are preferred by dint of the facility with which segment -morphs (segmorphs) can be assembled without recourse to insulating layers, while maintaining electrically independent addressability of each segmorph.

FIG. 21 is a perspective view of a representative embodiment of a composite transducer having two tangenters and a twister, or the -morph equivalents. This transducer positions surface R with rectilinear translations Tr1 and Tr2 by tangenters, rotation T1 by twister or twismorph, and the action T2 of the torsier of tormorph by cooperative activation of all segments. Each transducer segment is independently electrically addressable, and is activated by a separate electrical signal. The stroke of the composite transducer is the sum of the strokes of the segments, each segment stroke being mechanically independent (excepting generally negligible electromechanical coupling) of the other segments. Off-axis rotation is resolvable into the motional components of one pure rotation and two translations. For example, a torsion stroke T2 resolves to an increment of twist T1, an increment of radial adjustment Tr2, and a tangential increment Tr1. Replacing a torsier or tormorph with the action-equivalent transducer of FIG. 21 provides a greater positioning range because each segment relegates the entirety of its range to a single motion. In addition to providing two perpendicular linear translations and a pure rotation, the composite transducer also provides any other complex motion that is resolvable into these motional components. Activating the segments with selected electrical signals provides torsier action about axis A2, controls the location of axis A2 about axis A1, controls the distance D between A1 and A2, and even provides complex noncircular motion about a moving torsier axis A2. The range of D is electrically controllable from zero to infinity.

Figure 22:
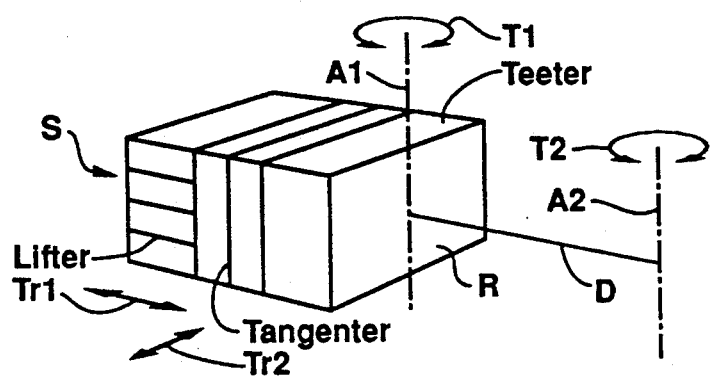
FIG. 22 is a perspective view of a stack of transducer segments having a lifter, a tangenter and a teeter.

FIG. 22 is a perspective view of a representative embodiment of a composite transducer having a lifter, a tangenter, and a teeter, or the segmorph equivalents. This transducer positions surface R with translation Tr1 by lifter, translation Tr2 by tangenter, and rotation T1 by teeter. This composite transducer also provides the action T2 of the swinger or swingmorph by coordinated activation of all segments. Each transducer segment is independently electrically addressable, and is activated by a separate electrical signal. The stroke of the composite transducer is the sum of the strokes of the segments, each segment stroke being mechanically independent (excepting generally negligible electromechanical coupling) of the other segments. Off-axis rotation is resolvable into the motional components of one pure rotation and two translations. For example, a swinging stroke T2 resolves to an increment of teeter T1, an increment of radial adjustment Tr1, and a tangential increment Tr2. Replacing a swinger or swingmorph with the action-equivalent transducer of FIG. 22 provides a greater positioning range because each segment relegates the entirety of its range to a single motion. In addition to providing two perpendicular linear translations and a pure rotation, this composite transducer also provides any other complex motion that is resolvable into these motional components. Activating the segments with selected electrical signals provides swinger action about axis A2, controls the location of axis A2 about axis A1, controls the distance D between A1 and A2, and even provides complex noncircular motion about a moving swinger axis A2. The range of D is electrically controllable from zero to infinity.

Figure 23:
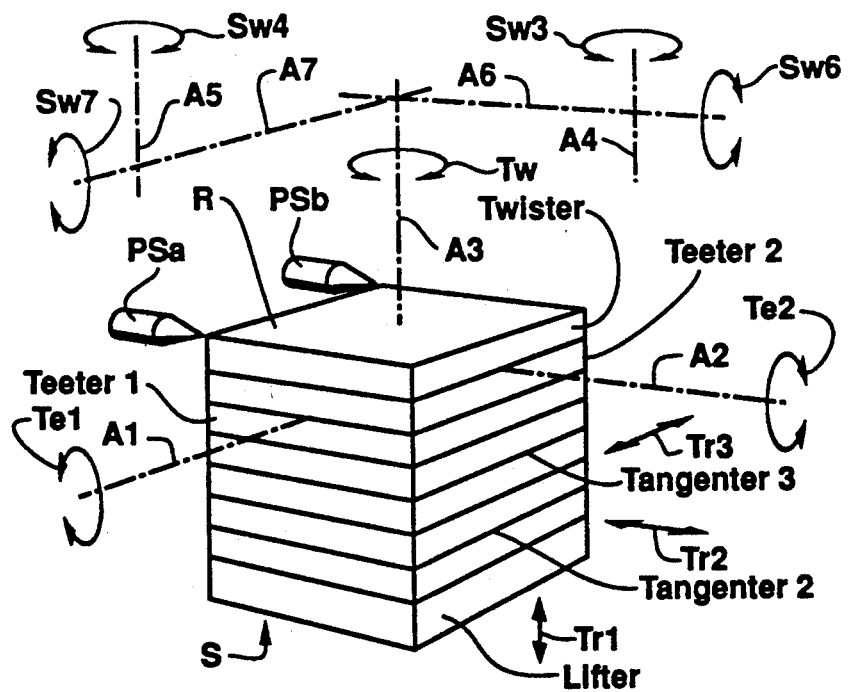
FIG. 23 is a perspective view of a stack of transducer segments having a lifter, two tangenters, two teeters, a twister and position sensors included to constitute a complex accelerometer.

FIG. 23 is a perspective view of a composite transducer that forcefully positions surface R relative to surface S with six degrees of freedom, and in a sense, with greater than six degrees of freedom by dint of the aforementioned ability of the composite twisting transducer to relocate axes of rotation during positioning about those axes. This example composite transducer includes, but is not limited to, a lifter, two tangenters, two teeters, and a twister. The "morph" form of each segment is used where needed to provide independent electrical addressability. The lifter and tangenters provide orthogonal linear motions Tr1, Tr2, and Tr3 of surface R, while the three twisting segments provide three rotations Te1, Te2, and Tw. When six distinct electrical signals of predetermined relative strengths are applied to the segments, virtual axis twists, for example, Sw3, Sw4, Sw6, and Sw7 are produced.

The term actuator is herein applied to transducers of the present invention in accordance with the convention that separates transducers, devices generally but not exclusively associated with converters of one form of electrical signal to another form of electric signal, from transducers acting as actuators that are generally but not exclusively associated with devices that convert electrical signals to useful mechanical work.

The composite transducer of FIG. 23 constitutes a complex accelerometer when supported surface S of the elastic bodied transducer is fixed to a rigid object that undergoes complex acceleration. When surface S is accelerated, the masses of the portions of the transducer body cause inertial reaction forces that deform body portions. A linear acceleration may cause a normal deformation, a shear deformation, or a compound deformation in accordance with the direction of the linear acceleration relative to the plane of surface S. An angular acceleration will deform the transducer body torsionally. A complex combination of linear and rotary accelerations deforms the composite transducer body in a complex manner. The electrical signals generated in each of the six transducer portions, three for shear deformations sensitive to linear accelerations, and three for twisting deformations sensitive to angular accelerations, are used to determine the magnitudes and directions (vectors) of the six acceleration components. In the more general case where accelerations are not aligned to primary directions of deformational sensitivity of the transducer, the set of six signals generated by the transducer are easily treated algorithmically to separate the six components of acceleration with respect to any one of a large number of possible predetermined coordinate axes.

A more sensitive and accurate composite accelerometer obtains when a composite transducer, for example, the transducer of FIG. 23, is used in conjunction with position sensors PSa, PSb, that are supported by mountings (omitted) to the same rigid means that supports transducer surface S. The preferred position sensors are quantum tunneling electrodes that provide an electrical signal consisting of an electron tunneling current that is a function of the gap between each electrode and a corresponding proximate transducer body surface portion. In an exemplary mode of use, the separate electric potential applied to each of the six portions of the transducer maintains a predetermined constant value of tunneling current flowing in each of the position sensors, while at rest in inertial space, and when subjected to any combinations of three angular and three linear accelerations.

As a (simplified) representative example, a linear acceleration of surface S parallel to axis A2 (FIG. 23) elicits an inertial reaction force parallel to axis A2 that elastically shears the transducer body in direction Tr2. As a result, the tunneling currents of the position sensors PSa and PSb change by a minute amount, the minute current change causes the electrical source to alter the potential in the corresponding Tangenter 2 transducer portion in direction Tr2 by a minute amount, until the body shape is electrically restored to the shape it had at rest, as indicated by a return of the tunneling currents to their predetermined corresponding at-rest values. Previous elastic and dynamic calibration of the transducer body deformations with known forces, including corresponding electrical responses, allows, in this simplified example, use of the potential applied to the Tangenter 2 body portion as an accurate measure of the linear acceleration.

In another (simplified) representative example, a rotary acceleration about axis A3 (FIG. 23) elicits a twisting inertial reaction deformation in direction Tw. As a result, the tunneling currents of position sensors PSa and PSb differ by a minute amount, the minute current difference causes the electrical source to alter by a minute amount the potential supplied to the corresponding Twister transducer portion in direction Tw until the body shape is electrically restored to the rest shape, as indicated by a return of the tunneling current difference to its predetermined rest value. The potential applied to the Twister body portion is therefore usable, in this simplified example, as an accurate measurement of the angular acceleration. Additional position sensors (omitted for clarity) provide deformation tunneling current signals corresponding to the other possible inertial reaction motions of responsive surface R or other appropriate body surface portions. Each body portion may have independent position sensors in embodiments that reduce the electromechanical coupling directly. Variants may have position sensors integrally fabricated with the transducer body or with each body portion. The integrally fabricated sensors may be an electrically separated portion of a lamina with its own electrical connection.

In practical 6-axis accelerometer embodiments of the present invention, the electrical and mechanical coupling between transducer body portions is unambiguously removed using six transfer functions having, as a group, six or fewer unknown parameters. A relatively simple computation, iterable in near-real-time, provides three twisting and three linear acceleration vectors referenced to an arbitrarily chosen coordinate system coincident with, offset from, or rotated relative to the principal coordinates of the transducer body.

An advantage of maintaining a constant elastic state of the transducer body by electrically nullifying accelerative elastic deformation is the exclusion of the temporal and spatial nonlinearity due to transducer body strain from the electromechanical transfer functions. The constant-zero-strain condition of the transducer body allows unambiguous computational correction of electrical transducer nonlinearities inherent in any real transducer. Another advantage of the zero-strain condition is the elimination of the need to compensate for the inherent nonlinear dependence of the magnitude of the tunneling current on electrode gap. A further advantage of the present invention used as the basis of a 6-axis accelerometer is that accelerations, either linear or angular, in either sense, are accommodated by the bidirectional transduction provided by bipolar electric activation of respective linear and twister elements by means of shear, particularly piezoelectric shear.

The sensitivity of 6-axis accelerometer embodiments of the present invention extends to the bounds determined solely (excluding Brownian agitation of the solid state) by the accuracy and sensitivity of the electrical components used in conjunction therewith. Transducer body deformation measurements by tunneling sensors are practiced on the order of a small fraction of an Angstrom unit ($\exp(-10)$ meter). These deformations may require a few tens of microvolts to maintain the zero-strain state. The range of accelerations measurable by the accelerometer embodiment of the 6-axis twisting composite transducer includes accelerations corresponding to the range of tens of microvolts to hundreds of volts, the correspondence determined by the scale and configuration of the particular transducer.

It will be evident to those versed in the particular arts that compound accelerometer embodiments of the present invention include but are not limited to subsets of the 6-axis transducer, including all combinations of shear and twister portions integrally fabricated, collocated, and alternatively, dispersed throughout an apparatus. An advantage of distributed accelerometer portions is a reduction of the degree to which transductions electromechanically couple, thereby simplifying the computation of separate components of linear and angular acceleration. A disadvantage of dispersing transducer elements throughout an apparatus is the admixture of the responses and coupling of the intervening supporting structure with the accelerative information.

The 6-axis accelerometer embodiment of the present invention, when made in small sizes with the preferred epitaxial methods, can be made many at a time and therefore at low cost. These embodiments provide small accelerometers with small masses and concomitant deformations appropriate to the small sensing range of the preferred tunneling electron position sensors. The small size provides high resonance frequency, high frequency response, and relatively great resistance to breakage due to shock and excess acceleration. The small size also decreases transducer body segment capacitance, thereby reducing the instantaneous electrical power needed to operate at a predetermined high frequency. Additionally, small size is a benefit to the generally cramped spaces of spacecraft, weaponry, and aerospace devices.

Obviously, many modifications and variations of the present invention are possible in light of the above teachings. It is therefore to be understood that, within the scope of the appended claims, the invention may be practiced otherwise than as specifically described.

The applicant has a copending application Ser. No. 07/708,643 filed May 31, 1991 which is hereby incorporated by reference, this application being a division of the copending application.

What I claim is:

1. An accelerometer comprising an actuator stack having a lifter and at least two tangenters all three acting perpendicular to each other, a twister and at least two teeters all three acting perpendicular to each other, a computer, at least six position sensors for detecting motion of the stack and sending a signal indicating said motion to the computer, the computer processing said motion data and sending a signal to the laminae in the actuator stack to place the actuator stack back in its rest position, the computer processing the signal data to the laminae to calculate the acceleration force experienced by the actuator stack.

2. An accelerometer as in claim 1 wherein the position sensors are quantum tunneling electrodes positioned in pairs adjacent to the stack.

3. An accelerometer comprising an actuator stack having at least three linear acting transducer lamina each acting perpendicular to the other two, so that a combination of their movements can account for three linear degrees of freedom of motion, and at least three angularly acting transducer lamina each acting perpendicular to the other two, so that a combination of their movements can account for three angular degrees of freedom of motion, a computer, at least six position sensors for detecting motion of the stack and sending a signal indicating said motion to the computer, the computer processing said motion data and sending a signal to the laminae in the actuator stack to place the actuator stack back in its rest position, the computer processing the signal data to the laminae to calculate the acceleration force experienced by the actuator stack. 1

* * * * *